United States Patent

Eichelsheim et al.

[11] Patent Number: 5,772,878
[45] Date of Patent: Jun. 30, 1998

[54] LIQUID FILTRATION DEVICE

[75] Inventors: Alexander V. Eichelsheim, Oldenzaal; Pieter Engelander, Veenendaal, both of Netherlands

[73] Assignee: Fairey Arlon B.V., Arnhem, Netherlands

[21] Appl. No.: 627,882

[22] Filed: Apr. 3, 1996

[30] Foreign Application Priority Data

Apr. 3, 1995 [NL] Netherlands ............................ 1000020

[51] Int. Cl.⁶ .......................... B01D 27/08; B01D 35/30; B01D 35/31
[52] U.S. Cl. .......................... 210/232; 210/238; 210/444; 210/450; 55/501; 55/502
[58] Field of Search ................................... 210/232, 238, 210/282, 450, 444; 55/502, 501

[56] References Cited

U.S. PATENT DOCUMENTS

| | | |
|---|---|---|
| 4,077,883 | 3/1978 | Bray . |
| 4,534,713 | 8/1985 | Wanner . |
| 4,686,038 | 8/1987 | Arnaud . |
| 4,781,830 | 11/1988 | Olsen . |
| 4,961,845 | 10/1990 | Dawson . |
| 5,035,798 | 7/1991 | Stenger . |
| 5,362,389 | 11/1994 | Hardison . |

FOREIGN PATENT DOCUMENTS

| | | |
|---|---|---|
| 30 13 761 | 10/1981 | Germany . |
| 6 603 489 | 9/1967 | Netherlands . |
| 497020 | 12/1938 | United Kingdom . |

*Primary Examiner*—Thomas M. Lithgow
*Attorney, Agent, or Firm*—Deveau, Colton & Marquis

[57] ABSTRACT

The invention relates to a liquid filtration device, comprising a substantially cylindrical housing one end of which is closed and the other end of which is connected to a head provided with an inlet and an outlet, a filtration element being provided within said housing. According to the invention the housing is formed by a tube section of the desired diameter and cut at the desired length, said tube section being closed, at its end opposite from the head of the filtration device, by a bottom piece inserted therein with a sliding fit, the outer circumferential face of said bottom piece being sealed to the corresponding part of the inner circumferential wall of the tube section by means of at least one O-ring engaged in a corresponding groove, while the bottom piece end opposite from the head of the filtration device bears on a snap ring Provided within an inner circumferential groove of the tube section.

7 Claims, 1 Drawing Sheet

LIQUID FILTRATION DEVICE

FIELD OF THE INVENTION

The invention relates to a liquid filtration device, comprising a substantially cylindrical housing one end of which is closed and the other end of which is connected to a head provided with an inlet and an outlet, a filtration element being provided within said housing.

BACKGROUND OF THE INVENTION

Filtration devices of this type are known for a long time and are used for cleaning various kinds of liquids under various pressures. A particular application is for cleaning hydraulic drive liquids, such as hydraulic oils and the like, which have to be cleaned during operation.

Conventionally the houses of such filtration devices have a semi-spherical bottom which is integrally formed with the cylindrical wall of the housing.

The conventional method for manufacturing such housing by cold extrusion is from aluminum for low pressure applications and from steel for high pressure applications respectively.

The mould costs involved with this manufacturing method are very high, considering that for each diameter and each length of the housing a specific set of moulds is required.

SUMMARY OF THE INVENTION

The invention aims at providing a filtration device of the type above referred to, the housing of which can be manufactured at considerably lower cost without affecting the suitability of the housing for use under high pressures.

According to the invention this aim is achieved in that the housing is formed by a tube section of the desired diameter and cut at the desired length, said tube section being closed, at its end opposite from the head of the filtration device, by a bottom piece inserted therein with a sliding fit, the outer circumferential face of said bottom piece being sealed to the corresponding part of the inner circumferential wall of the tube section by means of at least one O-ring engaged in a corresponding groove in the outer circumferential face of the bottom piece, while the bottom piece end opposite from the head of the filtration device bears on a snap ring provided within an inner circumferential groove of the tube section.

In a preferred embodiment the circumferential edge at the end face of the bottom piece opposite from the head of the filtration device has a bevel in the order of 45°. It is through this bevel that the bottom piece engages the inwardly projecting portion of the snap ring inserted in the groove in the tube section, so that in operation a radially inwardly directed force component will be exerted onto the snap ring, which secures a reliable hold of the bottom piece within the end of the tube section.

The required tube section may be simply obtained by cutting from tubes of the desired diameter which are available on the market at low prices. Dependent on the intended use—low pressure or high pressure—use may be made of a commercially available pipe of aluminum or of a pipe of steel.

Tests have surprisingly shown that a filtration device provided with a housing according to the present invention may be used, without problems, at pressures as high as 450 bar.

It is to be remarked that it is well-known per se to close the remote end of an hydraulic cylinder by a bottom piece slidable therein. In this case, however, pressures are involved which are not higher than 150 bar.

According to a further feature of the filtration device according to the present invention a chamber is hollowed out in the end face of the bottom piece facing towards the head of the filtration device so as to receive the remote end of the filtration element to be contained therein. This provides improved support for the filtration element within the housing as compared to the well-known construction, while the filter element is properly centered under all circumstances.

The invention will be hereinafter further explained by way of example with reference to the accompanying drawings.

DESCRIPTION OF THE PREFERRED EMBODIMENTS

Figure 1:
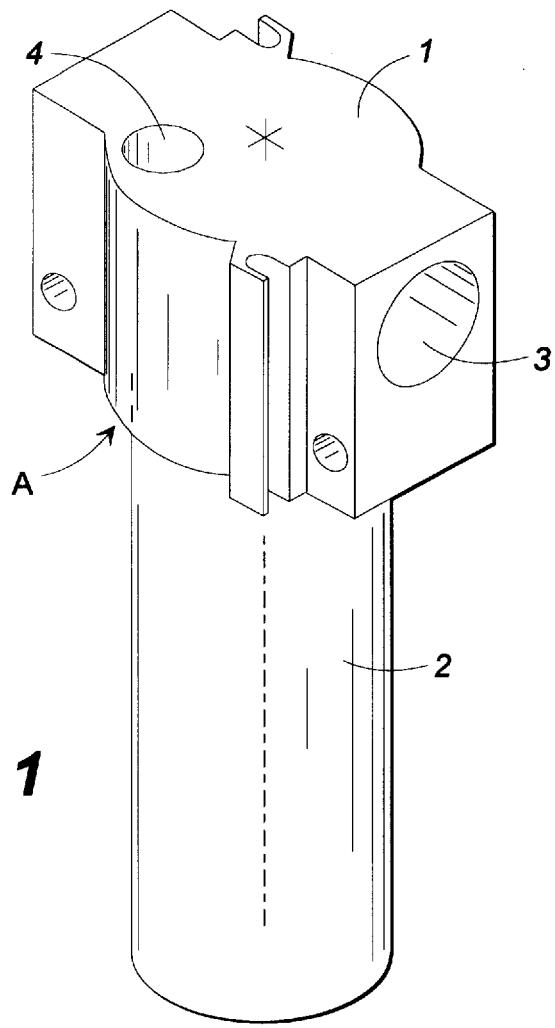
FIG. 1 is a perspective view of a filtration device according to the present invention and FIG. 2 shows a longitudinal section of the housing of the filtration device of FIG. 1.

The filtration device shown in FIG. 1 comprises a head 1 and a cylindrical housing 2 that is fastened, e.g. by screwing, into the lower end of the head, a filtration element of a well-known type (not shown) being received within the housing. The head 1 has an inlet-connection 3, an outlet-connection at the opposite side (not visible in the drawing) and a connection 4 for an indicator means for indicating the degree of contamination of the filtration element.

The housing 1 consists of a pipe section 2a cut at the desired length, one end of which is externally machined, at A, in a well-known manner and provided with screw threading for connection to the head 1. The other end of the pipe section 2A (the right hand end in FIG. 2) is machined for receiving—with a sliding fit—a disc shaped bottom piece 5.

The bottom piece has a circumferential groove 6 with an O-ring 7 received therein to sealingly engage the finished rearward end portion of the inner circumferential surface of the pipe section 2a. In the left hand end face of the bottom piece 5 a shallow chamber 8 is recessed to function as a centering space for the remote end of the filtration element (not shown).

The right hand end face 9 of the bottom piece 5 has a bevel edge 10 (preferably of 45°) that engages a springy locking ring or snap ring 12 of a circular cross-section that is received within an inner circumferential groove 11 of the pipe section.

In operation the pressure within the housing 2 causes the bevel 10 to exert a radially outwardly directed force component onto the snap ring 12, due to which a reliable hold of the bottom piece 5 within the pipe section 2a is secured.

Figure 2:
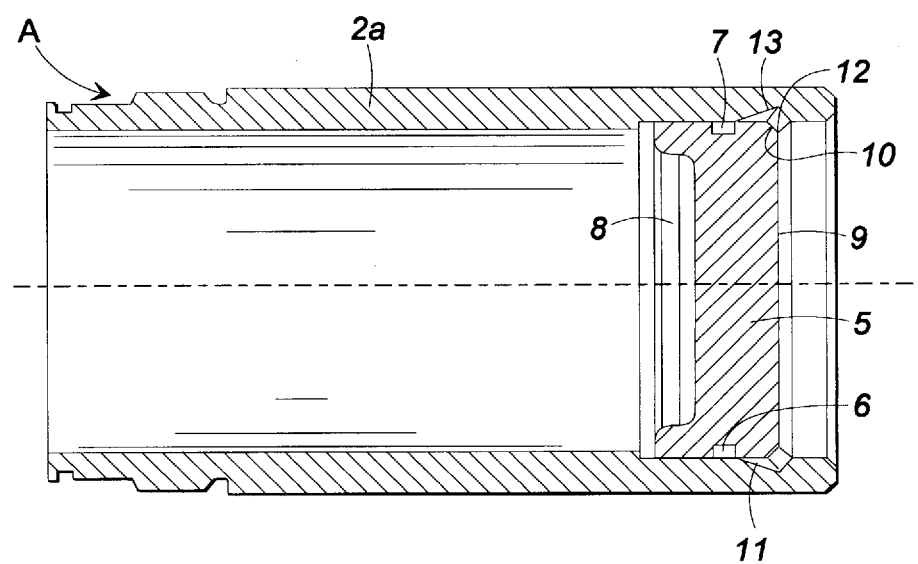

As shown in FIG. 2, the inner circumferential groove 11, receiving the split snap ring 12, leads to the left of the groove into a conical wall portion 13 that extends under a sharp angle relative to the axis of the housing so as to facilitate the positioning of the O-ring 7 when inserting the bottom piece 5.

We claim:

1. A liquid filtration device, comprising a substantially cylindrical housing one end of which is closed and the other end of which is connected to a head provided with an inlet and an outlet, a filtration element capable of being provided within said housing, wherein the housing is formed by a tube section of the desired diameter and cut at a desired length, said tube section being closed, at its end opposite from the head of the filtration device, by a bottom piece inserted therein with a sliding fit, the outer circumferential face of said bottom piece being sealed from the corresponding part of the inner circumferential wall of the tube section by means of at least one o-ring engaged in a corresponding groove in said bottom piece, wherein the circumferential edge at the end face of said bottom piece opposite from the head of the filtration device has an approximately 45° bevel, and wherein the bottom piece end opposite from the head of the filtration device bears on a snap ring provided within an inner circumferential groove of the tube section.

2. A filtration device according to claim 1, wherein a chamber is hollowed out in the end face of the bottom piece facing towards the head of the filtration device so as to be capable of receiving the remote end of the filtration element therein.

3. A filtration device according to claims 1 or 2 wherein the inner circumferential groove, which secures the split snap ring, leads towards the head of the filtration device into an inner peripheral conical wall portion extending under a sharp angle relative to the axis of the housing.

4. A liquid filtration device, comprising a substantially cylindrical housing one end of which is closed and the other end of which is connected to a head provided with an inlet and an outlet, a filtration element capable of being provided within said housing, wherein the housing is formed by a tube section of a desired diameter and cut at a desired length, said tube section being closed, at its end opposite from the head of the filtration device, by a bottom piece inserted therein with a sliding fit thereby forming an interface between said bottom piece and said tube section, the outer circumferential face of said bottom piece being sealed from the corresponding part of the inner circumferential wall of the tube section by means of at least one o-ring retained at the interface between said bottom piece and said tube section, wherein the circumferential edge at the end face of said bottom piece opposite from the head of the filtration device hag an approximately 45 bevel, and wherein the bottom piece is retained within said tube section by a snap ring at the interface between said bottom piece and said tube section.

5. A filtration device according to claim 4, wherein a chamber is hollowed out in the end face of the bottom piece facing towards the head of the filtration device so as to be capable of receiving the remote end of the filtration element therein.

6. A filtration device according to claim 5, wherein the snap ring is retained within a circumferential groove in said tube section which leads towards the head of the filtration device into an inner peripheral conical wall portion extending under a sharp angle relative to the axis of the housing.

7. A filtration device according to claim 4, wherein the snap ring is retained within a circumferential groove in said tube section which leads towards the head of the filtration device into an inner peripheral conical wall portion extending under a sharp angle relative to the axis of the housing.

* * * * *